Oct. 25, 1949.  E. E. HELIN  2,485,881
TEST PROD
Filed Dec. 22, 1945
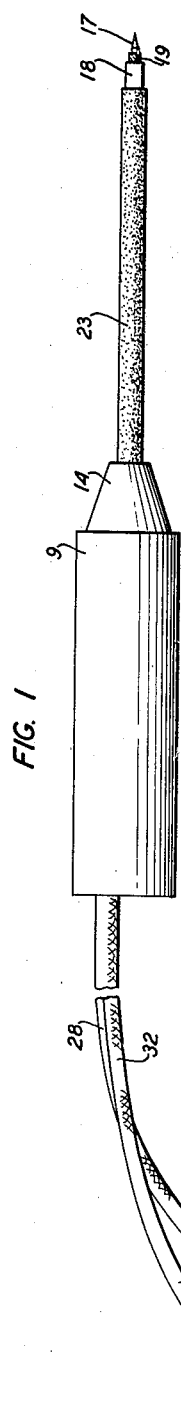
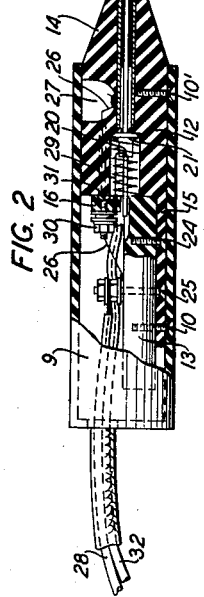
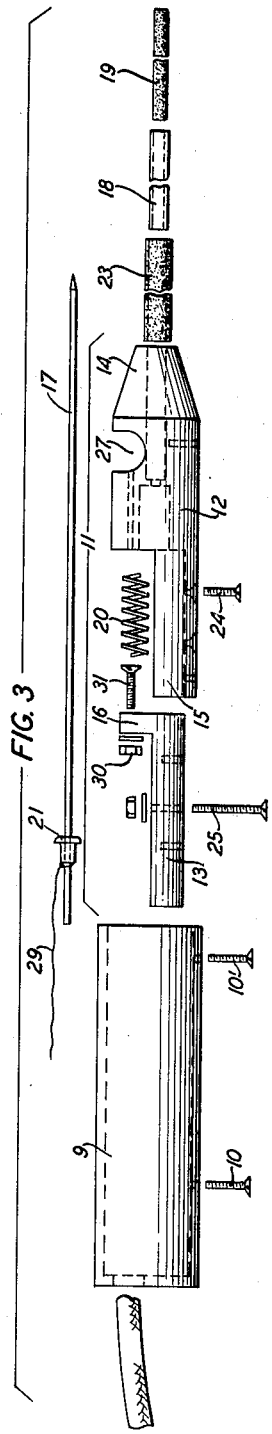
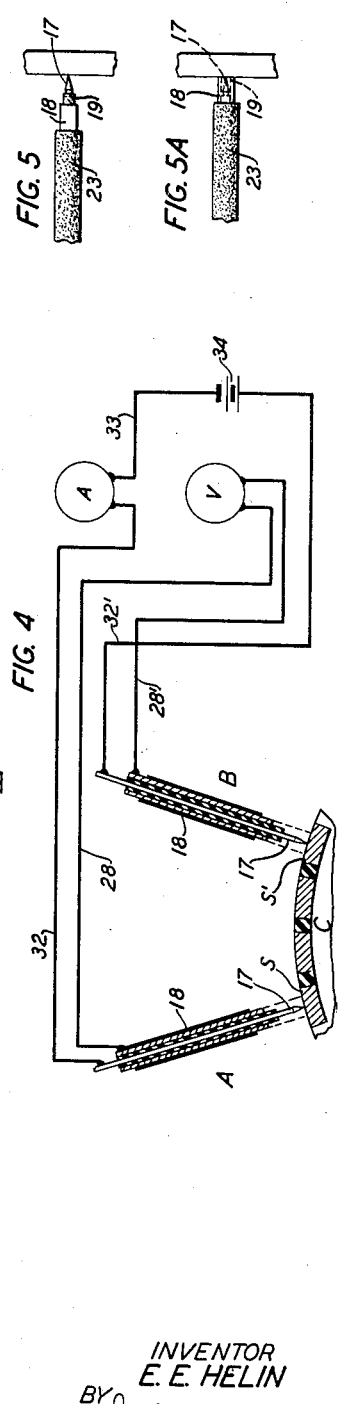
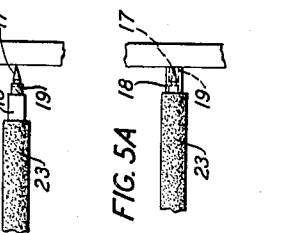
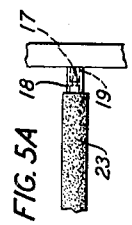
INVENTOR
E. E. HELIN
BY J. MacDonald
ATTORNEY Patented Oct. 25, 1949

2,485,881

UNITED STATES PATENT OFFICE 2,485,881

TEST PROD

Eero E. Helin, Franklin Square, N. Y., assignor to Bell Telephone Laboratories, Incorporated, New York, N. Y., a corporation of New York Application December 22, 1945, Serial No. 636,698

2 Claims. (Cl. 173—273)

This invention relates to electrical testing devices and more particularly to a test pick or prod for use in measuring the electrical resistance of conducting materials.

The object of the present invention is to provide a test pick or prod for use in confined or close quarters which incorporates in a single unitary structure means for measuring electrical resistance by the voltmeter-ammeter method.

Heretofore in the testing of conducting material, to determine its electrical resistance, by the voltmeter-ammeter method, it was necessary to use two sets of picks, one set in circuit with an ammeter and the other set in circuit with a voltmeter.

With the present invention a single set of test picks make both tests without removing the picks from the material being tested. This is due to the novel construction of the test picks which are connected with both the voltmeter and ammeter circuits in such a manner that the proper manipulation of the picks will give first a reading on one meter and then a reading on the other, thus combining in a single unitary structure means for performing in a single operation and with two picks what was heretofore done with four picks.

The pick or prod of this invention, in which two are used in place of the usual four, comprises an insulated housing having positioned therein an inner electrode and outer electrode, the inner electrode is slidably mounted within the outer electrode and is insulated therefrom. This permits the outer electrode to be moved downwardly into contact with material being tested to establish a second circuit while still maintaining the first circuit through the center electrode.

The invention will be more clearly understood from the following detailed description when read in connection with the following drawings of which:

Fig. 1 is a side elevational view of the test pick of this invention;

Fig. 2 is a view similar to Fig. 1, partly in section and with parts broken away;

Fig. 3 is an exploded view of the pick shown in Fig. 1; and,

Fig. 4 is a schematic illustrating the pick of this invention being used to test the segments on a commutator.

Fig. 5 is a fragmentary side elevational view of the front end of the test prod of this invention with the inner electrode in its extended position and making contact.

Fig. 5A is a view similar to Fig. 5 except that the outer electrode has been slidably positioned over the inner electrode and is also making contact.

The preferred embodiment of my invention, as shown in the various figures of the drawing, comprises a tubular shell or housing 9 of suitable insulating material which forms the body portion of the device and serves as a handle. Secured within the housing 9 by means of the screws 10 and 10' and extending substantially the full length thereof is the plug 11. This plug is also constructed of insulating material and comprises two members, namely, a forward member 12 and a rear member 13.

The forward member 12 is substantially circular in cross-section for approximately half its length (14) and has a semi-circular trough-shaped portion 15 extending rearwardly therefrom. The rear member 13 is semicircular in cross-section, is provided with a shoulder 16 at its inner end and is positioned in the trough-shaped portion 15 of the member 12 with the shoulder 16 abutting the front end of portion 14 as shown in Fig. 2.

Positioned within the plug member 11 and extending some distance beyond the portion 14 thereof, are a pair of electrodes 17 and 18. The electrode 17 is a solid rod while the electrode 18 is tubular. The electrode 17 is slidably mounted within the tubular electrode 18, is insulated therefrom by means of the insulating jacket 19 and extends a short distance beyond the end of the tubular electrode 18. The electrode 17 is maintained in its extended position, beyond the end of the electrode 18, by means of the spring 20 located in a recess in the member 12, one end of the spring bearing against the shoulder 21 on the electrode 17 while the other end engages the shoulder portion 16 of the member 13. The tubular electrode 18 is mounted in the plug 11 and is secured to the front portion 14 thereof by means of the screw 10'. An insulated jacket 23 encases the electrode 18 to prevent it from making accidental contact.

The rear member 13, which is semi-circular in cross-section, is positioned in the trough-shaped portion 15 of the member 14 and extends some distance beyond the rear end thereof and is secured therein by means of the screws 24 and 25. The screw 25 also serves as a binding post or terminal for the pigtail connection 26 which is connected to the tubular electrode 18 through an aperture in the groove 27 in the portion 14 of member 12. A lead wire 28 passes through the rear end of the housing 9 and terminates on the screw 25 to establish an electrical connection with the tubular electrode 18 through the aforementioned pig-tail connection 26.

A second pig-tail connection 29, which is soldered to the shoulder 21 of the solid electrode 17, as shown in Fig. 3, passes through an aperture in the shoulder 16 and is secured under the nut 30 of the screw 31. A second lead wire 32 which also passes through the rear of the housing 9 also terminates on the screw 31 to establish an electrical connection therewith to complete a circuit with the solid electrode 17. Thus we have the two electrodes 17 and 18 electrically connected to the lead wires and 32 by means of the pig-tail connections 26 and 29.

For the purpose of illustration I have shown in Fig. 4 a pair of picks or prods A and B being employed to test the armature windings (not shown) connected to the segments S and S' of the commutator C and as shown in full lines the solid electrodes 17—17 are in contact with the segments S and S' and are connected through leads 32 and 32' to the ammeter A and the battery 34. This circuit may be traced as follows, from the segment S through the solid electrode 17 of the pick A, over lead wire 32 to one side of the ammeter A, from the other side of the ammeter A over conductor 33 to one side of the battery 34, from the other side of the battery 34 back to the segment S' through lead 32', and the control electrode 17 of the pick B, thereby completing the circuit through the armature windings (not shown) connected to said segments, and obtaining a reading on the ammeter A.

With the central or solid electrodes 17—17 of the picks A and B still in contact with the segments S and S', the outer or hollow electrode 18—18 are moved downwardly, against the tension of spring 20, into contact with the segments S and S' as shown by the dotted lines, thus establishing a circuit through the hollow electrodes 18—18, voltmeter V and battery 34 as follows: From one side of the battery 34 over the lead 32' to the central electrode 17 of pick B, from the central electrode 17 to segment S', from segment S' to the outer or hollow electrode 18 of pick B, through electrode 18 over lead 28' to one side of the voltmeter V, from the other side of the voltmeter V over lead 28 to the hollow electrode 18 of pick A, through electrode 18 to segment S, through segment S to central electrode 17, through electrode 17 to lead 32, over lead 32 to one side of ammeter A, from the other side of ammeter A over conductor 33 and the other side of battery 34.

From the foregoing it will be observed that with the device of this invention, electrical tests which require both ammeter and voltmeter readings may be conveniently and expeditiously made without danger of short circuits particularly when making tests in close quarters where space is limited, and prevents opening of the ammeter circuit prior to the voltmeter circuit, thus preventing damage to the voltmeter.

While I have shown and described the preferred embodiment of the invention, it is to be understood that various changes and modifications may be made therein without departing from the spirit of the invention and I am limited only by the scope of the appended claims.

What is claimed is:

1. A test pick comprising a hollow housing, a plug of insulating material, having a central bore therein, fixedly secured in said housing and projecting a short distance from one end thereof, an elongated tubular metallic member secured in the bore of said plug and extending outwardly therefrom, an insulating jacket completely enclosing said member except for a small portion at the end thereof, a rod member, having an insulating jacket thereon, slidably mounted in said tubular member, means in said housing associated with said rod which maintains the end thereof in an extended position beyond the end of said tubular member and a pair of conductors extending from said housing having their inner ends connected to said tubular and said rod member.

2. A test pick comprising a hollow housing, a plug of insulating material, having a central bore therein, fixedly secured in said housing and projecting a short distance from one end thereof, an elongated tubular metallic member secured in the bore of said plug and extending outwardly therefrom, an insulating jacket completely enclosing said member except for a small portion at the end thereof, a rod member having an insulating jacket thereon slidably mounted in said tubular member and having its inner end located in a chamber in said plug, a collar on said rod for restricting the travel of said rod, spring means in said chamber bearing against said collar which maintains the end of said rod in an extended position beyond the end of said tubular member and a pair of conductors extending from said housing having their inner ends connected to said tubular and said rod member.

EERO E. HELIN.

REFERENCES CITED

The following references are of record in the file of this patent:

UNITED STATES PATENTS

| Number | Name | Date |
|---|---|---|
| 930,873 | Maijgren | Aug. 10, 1909 |
| 1,852,190 | Roe | Apr. 5, 1932 |
| 2,200,321 | Angell | May 14, 1940 |

FOREIGN PATENTS

| Number | Country | Date |
|---|---|---|
| 295,939 | Italy | 1932 |
| 553,869 | Great Britain | 1943 |